United States Patent Office 3,409,080

Patented Nov. 5, 1968

1

2

3,409,080

AQUEOUS CEMENTING COMPOSITION ADAPTABLE TO HIGH TURBULENT FLOW AND METHOD OF CEMENTING A WELL USING SAME

Hugh T. Harrison, Tulsa, Okla., assignor to The Dow Chemical Company, Midland, Mich., a corporation of Delaware No Drawing. Filed Apr. 4, 1967, Ser. No. 628,253
12 Claims. (Cl. 166—31)

ABSTRACT OF THE DISCLOSURE

An improved low fluid-loss aqueous cement slurry, comprising (1) bisalkylene pyrophosphate-urea pyrolysis product, (2) hydraulic cement, (3) a polymeric fluid-loss control agent, and (4) water, and method of cementing employing the composition.

The invention is an improved aqueous hydraulic cement slurry which is especially suited for use in cementing a well. The expression, "cementing a well" includes any operation in which a cement slurry is injected down a wellbore penetrating a geologic formation to be emplaced therein, subsequently setting to a monolithic solid. The type of geologic formation usually cemented is one bearing a fluid mineral of which petroleum oil, natural gas, brine, and water are most significant. The term, hydraulic cement, as used herein refers to Portland, aluminous pozzolan, or high-sulfate expansive cements.

The efficient obtention of fluid minerals has long presented a challenge to engineers and scientists. Problems associated therewith vary, dependent upon such conditions as the nature of the geologic formation, its location, the abundance and extent of the fluid mineral, and the relationship of the fluid-bearing stratum to adjacent and superimposed strata. The problems are invariably complex. Before a well becomes productive of such fluid, e.g. oil or gas, it is usually preceded by the following series of steps: (a) rights of exploration and drilling are ascertained; (b) a fluid-bearing stratum is then located through an exercise of these rights; (c) a bore-hole is drilled through the earth's crust and into the fluid-bearing stratum to tap the oil or gas therein; (d) casing is secured in position therein principally to insure, for practical purposes, permanence of the bore-hole for working the well; (e) a string of tubing is run into the hole inside of the casing and a pumping system provided (unless there is sufficient formation pressure) to bring the oil or gas to the surface; (f) the fluid flow from the well is thereafter maintained at a sufficiently high rate and for a sufficiently long period of time to make the venture economically feasible.

Since the advent of the first oil- and gas-producing wells, there have been marked advances in all phases of the above series of steps including: more dependable exploration techniques, better drilling and completion methods, and the use of improved compositions and processes of production which increase the rate of flow, assure longer production life, and prevent contamination of the fluid zone from intruding fluids, e.g., water and brine, and from dislodged earthen material.

Among the improved compositions and processes of drilling wells and producing oil and gas therefrom have been the discovery of improved cementing compositions and methods of cementing wells employing such compositions. Among the objectives attained by the use of an aqueous hydraulic cement composition in a well is that of cementing the casing in place, cementing off thief zones into which valuable minerals may be lost, and cementing off introduding water and brine to inhibit their intrusion into the fluid-producing zone of the oil or gas well.

Aqueous hydraulic cement compositions are usually employed in well cementing operations comprising water and the cement (Portland, aluminous, or pozzolan and more recently sometimes high sulfate expansive cements) known generally as a neat cement when no aggregate or sand is admixed therewith. Various additaments have been employed in cementing compositions, e.g., to control the rate of setting (particularly in wells penetrating formations at relatively high temperatures), to lessen the loss of the aqueous portion of the composition into the formation prior to its becoming set, and improved methods of locating and controlling the cementing operation at the desired level.

Among the desirable, if not essential, attributes of a satisfactory aqueous cementing composition for cementing wells is that of adequate fluidity and sufficiently slow thickening rate: to allow enough time for the composition to be spotted or located at the desired level; to maintain the pipe through which the slurry is being injected substantially free of adhering accumulations of cement; to assure adequate displacement of residual drilling mud; to make good contact and form firm footings or bonds, when set, with the face of the formation, and, when desired, with the casing; and to set to a strong durable unitary mass. It is also a desirable attribute of an aqueous cement slurry that the water content thereof be low if such can be attained without impairment of other properties, e.g., objectionable increased viscosity.

In general, the cementing compositions employed heretofore have failed to insure the attainment of the abovementioned objectives, particularly those of adequate displacement of residual mud and forming of firm bonds with the formation in all instances.

A need accordingly continues to exist for a settable cement slurry and a method of cementing wells in geologic formations wherein the slurry is brought into contact, and sets to a solid while in contact, with an earthen formation whereby improved bonding between the earthen formation and the set cement is attained.

The invention meets this need. It provides a cementing composition which exhibits, while being moved along a conduit, e.g., while being injected down a wellbore, less tendency to bridge; to remove more completely adhering mud in such conduit; and to exhibit reduced yield point and/or reduced coefficient of rigidity (as hereinafter explained). Such properties permit the aqueous cement slurry to be pumped through such conduit and positioned in contact with an earthen surface in a turbulent state at a lesser rate of movement (and accordingly less expenditure of energy) than is otherwise required.

The invention is an aqueous hydraulic cement composition having improved properties whereby it may be injected in a state of turbulence without the expenditure of the amount of additional energy usually required to attain such state. Turbulence in a cement slurry during movement along the conduit, as when being injected down a wellbore, insures the above discussed advantages of better bonding with the earth with which it is in contact during the setting period and with which a good watertight and high-strength bond is desired.

The composition of the invention comprises (1) an hydraulic cement, i.e., Portland, aluminous, pozzolan, or high sulfate expansive cement, (2) an O,O-alkylene-O'-O'-alkylenepyrophosphate-urea pyrolysis product (sometimes known as bisalkylenepyrophosphate-urea prolysis product) as a turbulence inducer, and (3) water in sufficient amount to make a pumpable settable slurry.

It is preferred, in the practice of the invention, wherein the cement slurry is brought into contact with a porous earthen formation, that a polymeric fluid-loss control agent be admixed with the slurry.

The use of such type of fluid-loss control agent is a particular feature of the invention because ordinarily, according to practice heretofore followed, such type of fluid-loss control agents could be used only sparingly because, unless so used they tended to thicken the slurry so that it could not be satisfactorily pumped or otherwise moved. The presence of the turbulence inducer according to the invention maintains the slurry highly fluid even in the presence of adequate quantities of such fluid-loss control agent.

The method of the invention comprises forcing the composition so made through a confining passageway such as a well pipe, casing, or open hole, at a rate of flow which creates a state of turbulence which need not be at as high a rate of flow as is otherwise required to create the turbulent state, and emplacing the slurry (thus forced through the passageway), in contact with an earthen formation, where it sets to a solid which provides a fluid-tight, strong cement seal. By attaining the turbulent state at a lower rate of flow, a substantial saving in the amount of energy and power required to be expended to move the slurry is realized.

The amount of turbulence inducer to employ is that which is effective to attain the above stated objective. The amount is relatively small. Between about 0.2 and about 5.0 parts per 100 parts of hydraulic cement (dry weight) are recommended to be present in the slurry. The preferred amount to use is between 0.5 and 1.5 parts per 100 parts dry weight of cement present.

The amount of polymeric fluid-loss agent to employ (when deemed advisable to use it) is also that which is effective to meet the conditions; between about 0.2 and about 5.0 parts per 100 parts of cement (dry weight) is recommended. The preferred amount to use is between about 0.5 and 2.0 per 100 parts dry weight of cement present. Among the polymeric fluid-loss agents that may be used are cellulose derivatives such as hydroxyethyl cellulose, polyvinylpyrrolidone, polyvinylmorpholinone, polyvinyloxazolidinone, polyvinylalkyloxazolidinones, polyvinyl alcohol, polyvinylacetate, copolymers of maleic anhydride with any of vinylpyrrolidone, vinylmopholinone, or vinyloxazolidinone, polystyrenesulfonate, polyvinyltoluenesulfonate, and water-soluble salts of such polymers.

The efficacy of an additive in an aqueous cement slurry to induce turbulence is measured by the procedure set out hereafter under examples.

The turbulence inducer required in the practice of the invention is the condensation product of an alkylene pyrophosphate and urea. The alkylene pyrophosphate component used to prepare the turbulence inducer used in the invention is considered to have the generic formula

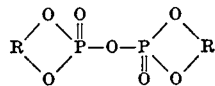

where R is an alkylene radical of 2 to 8 carbon atoms in which the carbon atoms of attachment to each of two oxygen atoms of the phosphate group are either vicinal or terminal carbon atoms of the alkylene group. Hydrogen atoms of the alkylene group may have been substituted by such substituents as phenyl or cycloalkyl as described in U.S. Patent 3,159,591. The more common species are the bisethylene and the bispropylene species. The following formula is considered to represent the O,O-ethylene-O',O'-ethylene-pyrosphosphate species:

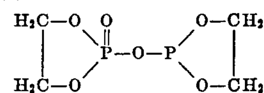

Methods of preparation and physical properties of such O,O-alkylene-O',O'-alkylene pyrophosphates are known. The pyrolysis product of the O,O-ethylene-O',O'-ethylene pyrosphosphate and urea may be prepared by admixing O,O-ethylene-O',O'-ethylene pyrosphosphate and urea, both of which are normally in a dry state, employing a molar excess of urea, usually from about 2 to 4 moles of urea per mole of O,O-ethylene-O',O'-ethylene pyrophosphate. The reaction molar ratio appear to be 1 pyrosphosphate to 3 of urea. The admixture is heated slowly to at least about 100° C. and thereafter, allowed to rise to between about 140° and 200° C. The reaction is observed to begin when the temperature has reached about 100° C. Being exothermic thereafter, the temperature of the reaction rises autonomously and may go as high as 300° C. unless cooling is provided. Accordingly, it is recommended that cooling be provided to restrict the temperature rise to not over about 200° C. and preferably not over about 180° C. The product formed is a glassy solid which is soluble in water and which has a pH value in water of between 3 and 4.

As an alternative method of preparing the pyrolysis product, the reactants may first be dissolved in a suitable inert solvent, e.g., xylene, toluene, or the like, and the reaction product recovered by removal thereafter of the solvent by volatilization.

The following are typical analyses ranges of the pyrolysis product formed:

| | |
|---|---|
| Carbon | 19–21%. |
| Phosphorous | 15–19%. |
| Nitrogen | 17–21%. |
| Balance | Largely H or H in combination to form a gas. |

O,O-ethylene-O',O'-ethylene pyrophosphate-urea pyrolysis product acceptable for the practice of the invention was prepared as follows:

200 grams (0.87 mole) of O,O-ethylene-O',O'-ethylene pyrophosphate and 146 grams (2.43 moles) of urea in a particulated state, were mixed in a suitable container and the resulting mixture, while accompanied by stirring, was heated. At 100° C., reaction was observed to take place and gas to evolve. The temperature thereafter rose gradually to 185° C. and at that temperature became noticeably exothermic whereupon the temperature rose to somewhat above 240° C. It thereafter subsided, ultimately returning to room temperature. A reaction product formed which was glass-like and soluble in water and had a pH value in water of between 3 and 4. It had the following analysis.—C, 19.9%; P, 18.4%; N, 17.6%; H, 5%.

Additional information on the preparation of the O,O-alkylene-O',O'-alkylenepyrophosphate-urea pyrolysis product may be obtained from Ser. No. 615,062, filed Feb. 10, 1967.

Cement slurries (as is also true of clay base drilling muds) behave according to the general principles of Bingham plastic fluids. Accordingly, when a stress is supplied to an aqueous cement slurry, it remains substantially static until the strain builds up to a value known as the yield point. This is designated *ty*. It is measured in pounds per square foot. After the slurry has started to move, further increases of shear stress cause proportional increases in shear rate. The ratio of shear stress to shear rate is known as coefficient of rigidity. This is designated *n*. It is measured in mass pounds per second-foot. The coefficient of rigidity (*n*) may be converted to centipoises by multiplying it by 1488. Desirable rheological properties of an aqueous cement slurry exist in a slurry having low $n$ and/or $ty$ value to give a low rate in barrels per minute (as shown in the equation set out below) but which yet results in the slurry being moved in a turbulent state. A low $ty$ value is more significant than a low $n$ value.

The following values are obtained to establish the existence of turbulence: the diameters of the borehole; the outside diameter of the pipe through which the slurry will be injected into the well; the density of the slurry in pounds per gallon; the coefficient of rigidity ($n$) in pounds per second-foot; and the yield value in pounds per square foot ($ty$). The $n$ and $ty$ values are calculated from the Fann values. Procedures for use of the Fann instrument accompany the instrument or may be obtained from the Fann Instrument Corporation, 3202 Organne, Houston, Texas. The critical pump rate at which laminar flow becomes trubulent flow is then calculated according to the equation:

$$PR_c=140(D_h+D_p)\left[n\sqrt{\frac{n^2+(D_h-D_p)^2ty\alpha}{2690}}\right]$$

where:

$PR_c$ is the critical pump rate in barrels per minute.
$D_h$ is the diameter of the borehole in inches.
$D_p$ is the outside diameter of the pipe in inches.
$\alpha$ is the density of the slurry in pounds per gallon.
$n$ is the coefficient of rigidity in pounds per second-foot.
$ty$ is the yield value in pounds per square-foot.

To determine these values by the use of the viscometer, the cement is dry-mixed in accordance with the procedure in API RP 10B. The dry cement is then made into a slurry, employing the proportions of cement and water specified in Section 2, Table 2 of API RP 10B, e.g., 46 parts of water per 100 parts of dry Class A Portland cement by weight, and is immediately transferred to the Fann sample cup. The instrument reading of the Fann Viscometer is then ascertained at a speed of 600 revolutions per minute (r.p.m.). After the reading has become stabilized at the 600 r.p.m. speed, the instrument is adjusted to 300 r.p.m. and the reading again recorded after the value becomes stabilized at that speed. The rigidity ($n$) and the yield value ($ty$) are calculated as follows:

$$n=N\text{ (600 reading}-\text{300 reading) (0.000672)}$$

$$ty=N\left[\frac{\text{300 reading}-\text{(600 reading}-\text{300 reading)}}{100}\right]$$

$N$=in the above equations is the extension factor of the torque spring of the instrument. This is a value for each instrument and is a part of the direction for use of the instrument obtainable from the Fann Company.

The practice of the invention is exemplified by the following tests which illustrate, but do not limit the practice of the invention. Blank tests were conducted for purposes of comparison. In all tests, the following conditions apply:

186 milliliters of deionized water and 400 grams of API Class A hydraulic cement were used.

The fluid-loss of the slurry so prepared was obtained according to the procedure set out in API RP 10B, 13th edition (1965), Section 5 (pages 7 to 8) employing a Baroid low pressure filter press and a 500 mesh Dutch Weave Series Screen. The test was run at 100 p.s.i. until 30 minutes had elapsed or until 50 milliliters of fluid had collected, which ever occurred first. These data are tabulated under the caption "Time in Seconds."

The compressive strength values were obtained on the same cement samples that had been used to obtain rheological and fluid-loss control properties. The compressive strength tests were conducted as follows:

The slurry to be tested was poured into 4-dram glass vials, the vials capped and tapped on a hard surface to eliminate any trapped air. The vitals and contents were then placed in a 150° F. constant-temperature water bath for the number of days shown under the "compressive strength" column of Table I, infra.

Upon removal from the constant-temperature water bath, the glass vials were broken away and each cement sample therein carefully cut to a length of about 1½ inches, using a diamond blade so as to provide parallel end faces. The samples were then placed in a Tinius Olson testing machine and tested according to standard

TABLE I

| Test Number | Concentration of Turbulence Inducer Added in Parts by Wt. | Fluid Loss Control Additive | $n$ value | $ty$ value | Time in Seconds | Compressive Strength After Aging the Number of Days Indicated at 150° F. | |
|---|---|---|---|---|---|---|---|
| | | | | | | Time(Days) | P.s.i. |
| Blank 1 | None | None | 0.010 | 0.82 | 30 | 2 | 4,550 |
| Blank 2 | do | do | 0.010 | 0.82 | 30 | 5 | 5,050 |
| Blank 3 | 0.1 | do | 0.012 | 0.72 | 51 | 5 | 3,800 |
| Example 1 | 0.2 | do | 0.014 | 0.58 | 47 | 5 | 5,050 |
| Example 2 | 0.3 | do | 0.025 | 0.59 | 32 | 5 | 5,150 |
| Example 3 | 0.5 | do | 0.014 | 0.12 | 20 | 1 | [1] 2,100 |
| Example 4 | 1.0 | 0.2 PG (1) | 0.025 | 0.04 | 21 | 3 | 6,850 |
| Example 5 | 1.5 | 0.2 PG | 0.003 | 0.06 | 21 | 3 | 7,750 |
| Example 6 | 1.0 | 0.2 PG, 1.0 Pym (2) | 0.031 | 0.10 | 30 | 3 | 4,950 |
| Example 7 | 1.0 | 0.2 PG, 1.0 Pym (3) | 0.036 | 0.16 | 49 | 3 | 5,750 |
| Example 8 | 1.0 | 0.2 PG, 1.0 Pym (4) | 0.031 | 0.12 | 31 | 3 | 5,200 |
| Example 9 | 1.0 | 0.2 PG | 0.037 | 0.17 | 52 | 3 | 5,200 |
| Example 10 | 1.0 | 0.2 PG, 1.0 Pym (5) | 0.029 | 0.09 | 21 | 3 | 5,600 |
| Blank 4 | None | Pym (5) | 0.050 | 1.45 | 60 | 3 | 5,600 |
| Example 11 | 1.0 | 0.2 PG, 1.0 Pym (5) | 0.041 | 0.11 | 65 | 1 | 2,300 |
| Blank 5 | None | 1.0 Pym (5) | [2] | [2] | 160 | 2 | 5,000 |
| Example 12 | 1.0 | 0.2 PG, 1.0 Pym (6) | 0.037 | 0.06 | 46 | 1 | 3,450 |
| Example 13 | 1.0 | 0.2 PG, 1.0 Pym (7) | 0.041 | 0.23 | 79 | 1 | 2,900 |
| Blank 6 | None | 0.2 PG, 1.0 Pym (7) | 0.046 | 1.06 | 84 | 1 | 4,650 |

[1] At 100° F. [2] Too thick to evaluate.

PG (1) 1 Part of polyoxypropyleneglycol, average molecular weight of 4,000, admixed with 2 parts of fuller's earth, as a defoaming agent. Pym (2) A 23% aqueous dispersion of a polymer prepared by polymerizing 93% by weight of sodium polysulfoethylmethacrylate (abbreviated elsewhere herein as NaSEM) and 7% of hydroxyethylacrylate (abbreviated elsewhere herein as HEA). Pym (3) A 21% aqueous dispersion of a polymer prepared by polymerizing 60% by weight of NaSEM and 40% of HEA. Pym (4) A 17% aqueous dispersion of a polymer prepared by polymerizing 15% by weight of NaSEM and 85% of HEA. Pym (5) A 27% aqueous dispersion of a polymer prepared by polymerizing 90% by weight of NaSEM and 10% of acrylamide. Pym (6) 26% acueous solution of 50% by weight of NaSEM and 50% acrylamide. Pym (7) Polyvinyl alcohol, a 4% aqueous solution of which has a viscosity of 22 centipoises, and which is 88% hydrolyzed.

procedure. The Tinius Olson readings were corrected to p.s.i. values multiplying by the correct factor, viz 1.426.

The rheology, fluid loss, and compressive strength values of the examples and of a control or blank sample are set out in Table I.

Reference to the table shows that the presence of the O,O-ethylene-O',O'-ethylene pyrophosphate-urea pyrolysis product, in accordance with the practice of the invention, imparts desirable rheological properties, as evidenced by low *ty* and *n* values. This shows that the pyrolysis product induces turbulence into the cement slurry when the slurry containing it is being moved along or through a conduit at a lower rate of movement than would otherwise be necessary to attain the turbulent state. The amount of the pyrolysis product to add to insure practical improved results is shown to be at least about 0.2 part (based on the dry weight of cement in the slurry) as shown by the improvement in Example 1 over Blank 3. Such induced turbulence achieves superior bonding of the set cement to the formation without commensurate added pumping costs.

Reference to the table also shows that the fluid loss of a cement slurry containing the pyrolysis product, as required by the invention, is clearly desirably lessened as the amount of the product being added is increased up to about 1 part thereof. The table also shows that fluid loss additives, such as the polymers shown, may be admixed with the cement slurry containing the turbulence inducing pyrolysis product to attain even lower fluid loss values.

It is obvious that other polymers, not shown in the table, such as the celluolse ethers, e.g., hydroxy-ethyl cellulose, and polyvinyltoluenesulfonate or polystyrenesulfonate, cross-linked polyacrylamide polymers or copolymers, or polyoxazolidinone polymers could be satisfactorily used with the turbulence inducer according to the practice of the invention. The use of such polymers in effective amounts, e.g., 0.2 to about 5.0 parts by dry weight of the cement, without seriously adversely effecting the flow and pumping properties of the slurry is highly significant. In the absence of the turbulence inducer and its accompanying thinning (viscosity reducing) effect, only insignificant amounts of the fluid loss control agents can usually be employed.

A defoaming agent, if desirable, is shown to be compatible with the turbulence inducing additive.

Having described my invention, what I claim, and desire to protect by Letters Patent, is:

1. A composition comprising, by weight (1) 100 parts of an hydraulic cement selected from the class consisting of Portland, pozzolanic, aluminous and high-sulfate expansive cements; (2) between about 0.2 and about 5.0 parts of an O,O-alkylene-O',O'-alkylene pyrophosphate-urea pyrolysis product prepared by reacting a molar ratio of 1 of the O,O-alkylene-O',O'-alkylene pyrophosphate to between about 2 and about 4 of urea; and (3) sufficient water to make a pumpable aqueous slurry which sets upon standing to a monolithic solid.

2. The composition of claim 1 which contains up to 2.0 parts of a water-insoluble, water-dispersible polymeric material.

3. The composition of claim 2 wherein the O,O-alkylene-O',O'-alkylene pyrophosphate employed to prepare the component identified as (2) is O,O-ethylene-O',O-ethylene pyrophosphate.

4. The composition of claim 2 wherein the O,O-alkylene - O',O' - alkylene pyrophosphate - urea component identified as (2) is employed in an amount of between about 0.5 and about 1.5 parts per 100 parts of hydraulic cement.

5. The composition of claim 2 wherein the polymeric material employed is selected from the class consisting of polyvinylpyrrolidone, polyvinylmorpholinone, polyvinyloxazolidinone, polyvinylalkyloxazolidinones, polyvinyl alcohol, polyvinyl acetate, polystyrenesulfonate, polyvinyltoluene sulfonate, water-dispersible cellulose ethers, copolymers of maleic anhydride and a monomer selected from the class consisting of vinylpyrrolidinone, vinylmorpholinone, vinyloxazolidinone, a vinylalkyloxazolidinone, and water dispersible salts of such polymers.

6. The method of cementing which requires an aqueous settable hydraulic cement slurry to be emplaced, via a confining passageway, in contact with an earthen formation comprising forcing the aqueous composition of claim 1 through said passageway at a rate of movement sufficient to attain a state of turbulence in said slurry while in motion therein and which is accompanied by decreased loss of fluid to the formation during the setting period, and allowing the so emplaced slurry to set to a monolithic solid, whereby improved bonding is achieved between the formation and the set cement.

7. The method of cementing a well which requires an aqueous settable cement slurry to be emplaced, via a confining passageway, in contact with an earthen formation which comprises forcing the aqueous composition of claim 2 through said passageway at a rate of movement sufficient to attain a state of turbulence in said slurry while in motion therein which is accompanied by decreased loss of fluid to the formation during the setting period, and allowing the so emplaced slurry to set to a monolithic solid, whereby improved bonding is achieved between the formation and the set cement.

8. The method of cementing a well which requires an aqueous settable cement slurry to be emplaced, via a confining passageway, in contact with an earthen formation which comprises forcing the aqueous composition of claim 3 through said passageway at a rate of movement sufficient to attain a state of turbulence in said slurry while in motion therein and which is accompanied by decreased loss of fluid to the formation during the setting period, and allowing the so emplaced slurry to set to a monolithic solid whereby improved bonding is achieved between the formation and the cement, when emplaced and ultimately set.

9. The method of cementing a well which requires an aqueous settable cement slurry to be emplaced, via a confining passageway, in contact with an earthen formation which comprises forcing the aqueous composition of claim 4 through said passageway at a rate of movement sufficient to attain a state of turbulence in said slurry while in motion therein and which is accompanied by a decreased loss of fluid to the formation during the setting period is attained, and allowing the so emplaced slurry to set to a monolithic solid, whereby improved bonding is achieved between the formation and the cement, when emplaced and ultimately set.

10. The method of emplacing, via a cased well-bore, an aqueous hydraulic cement slurry in the annulus between the face of an earthen formation and the casing of the wellbore which penetrates the formation whereby a turbulent state is attained in said slurry while being moved down the wellbore and into the annulus at less rate of flow and at less expenditure of energy than is normally required to attain such turbulent state and whereby loss of fluid from the cement slurry to the formation prior to set is lessened which comprises admixing with said slurry, prior to its ultimate emplacement, a small but effective amount, sufficient to attain such turbulent state of an O,O-ethylene-O',O'-ethylene pyrophosphate - urea pyrolysis product prepared as a glassy solid by reacting a mole ratio of 1 O,O-ethylene-O',O'-ethylene pyrophosphate to between 2 and about 4 of urea at a temperature of at least about 100° C. and a maximum temperature of not over about 300° C., cooling the reaction mixture, and separating the glassy solid from the reaction mixture.

11. The method according to claim 10 wherein there is admixed with said aqueous hydraulic cement slurry a small but effective amount of a polymeric fluid-loss additive selected from the class consisting of polyvinylpyrrolidone, polyvinylmorpholinone, polyvinyloxazolidinone, polyvinylalkyloxazolidinones, polyvinyl alcohol, polyvinyl acetate, polystyrenephosphate, polyvinyltoluenesulfonate, copolymers of maleic anhydride and a monomer selected from the class consisting of vinylpyrrolidinone, vinylmorpholinone, vinyloxazolidinone, vinylalkyloxazolidinones, and water-insoluble, water-dispersible cellulose ethers, and water-dispersible salts of such polymers.

12. The method according to claim 11 wherein each of said O,O-ethylene-O',O'-ethylene pyrophosphate-urea pyrolysis product and said polymeric fluid-loss additive is present in an amount of between 0.2 and 5.0 parts per 100 parts by weight of the hydraulic cement present.

References Cited

UNITED STATES PATENTS

| | | | |
|---|---|---|---|
| 2,848,340 | 8/1958 | Haldas | 166—31 |
| 2,892,728 | 6/1959 | Jolly | 106—90 X |
| 3,030,258 | 4/1962 | Wagner | 106—93 X |
| 3,116,264 | 12/1963 | Wahl | 166—31 X |
| 3,140,269 | 7/1964 | Wahl et al. | 166—31 X |
| 3,159,591 | 12/1964 | Lanham | 260—2.5 |
| 3,234,154 | 2/1966 | Martin | 106—93 X |
| 3,243,307 | 3/1966 | Selden | 106—93 |

STEPHEN J. NOVOSAD, *Primary Examiner.*